United States Patent
Feger et al.

(10) Patent No.: US 7,549,677 B2
(45) Date of Patent: Jun. 23, 2009

(54) DEVICE FOR SEALINGLY LINKING TWO END PIECES

(75) Inventors: Axel Feger, Lörrach (DE); Michael Trede, Habsheim (FR)

(73) Assignee: A. Raymond & Cie, Grenoble (FR)

( * ) Notice: Subject to any disclaimer, the term of this patent is extended or adjusted under 35 U.S.C. 154(b) by 553 days.

(21) Appl. No.: 10/565,287

(22) PCT Filed: Jun. 10, 2004

(86) PCT No.: PCT/EP2004/011152

§ 371 (c)(1),
(2), (4) Date: Jan. 20, 2006

(87) PCT Pub. No.: WO2005/061942

PCT Pub. Date: Jul. 7, 2005

(65) Prior Publication Data

US 2006/0175830 A1  Aug. 10, 2006

(30) Foreign Application Priority Data

Nov. 27, 2003 (DE) ................................. 103 55 535

(51) Int. Cl.
*F16L 39/04* (2006.01)
*F16L 21/03* (2006.01)
*F16L 33/18* (2006.01)
(52) U.S. Cl. .................... 285/12; 285/319; 285/331; 285/336; 285/349; 285/351
(58) Field of Classification Search .................. 285/12, 285/305, 319, 921, 331, 336, 345, 348, 349, 285/350, 351
See application file for complete search history.

(56) References Cited

U.S. PATENT DOCUMENTS

| 3,684,321 | A | * | 8/1972 | Hundhausen et al. | ....... 285/316 |
| 4,009,896 | A | * | 3/1977 | Brewer | ....... 285/305 |
| 4,219,222 | A | * | 8/1980 | Brusadin | ....... 285/8 |
| 4,601,497 | A | | 7/1986 | Bartholomew | |
| 4,660,803 | A | * | 4/1987 | Johnston et al. | ....... 251/149.1 |
| 4,673,199 | A | * | 6/1987 | Renfrew | ....... 285/316 |
| 4,696,495 | A | * | 9/1987 | Oliver | ....... 285/86 |

(Continued)

FOREIGN PATENT DOCUMENTS

EP     0806597 A    11/1997

(Continued)

*Primary Examiner*—James M Hewitt

(57) ABSTRACT

A device for sealingly linking two end pieces (24) of a fluid line system, comprises a casing part (1) and an inner part (13). The inner part (13) is arranged in a prefabricated arrangement within the casing part (1) in an axially displaceable manner and serves to fixate a sealing unit (21) that is detachably linked with the inner part (13) until an end piece (25) is inserted into the casing part (1) via an introduction area (3) and comes into contact with the inner part (13). When the end piece (25) is inserted, the inner part (13) is axially expelled from the casing part (1), whereby the sealing unit (21) is inhibited in its axial movement by an abutment (12) and remains within the casing part (1). The two end pieces can be sealingly linked while indicating the relative position of the end piece (25) coming into contact with the inner part (13) without requiring a separate handling of the sealing unit (21).

11 Claims, 3 Drawing Sheets

U.S. PATENT DOCUMENTS

Figure 1:
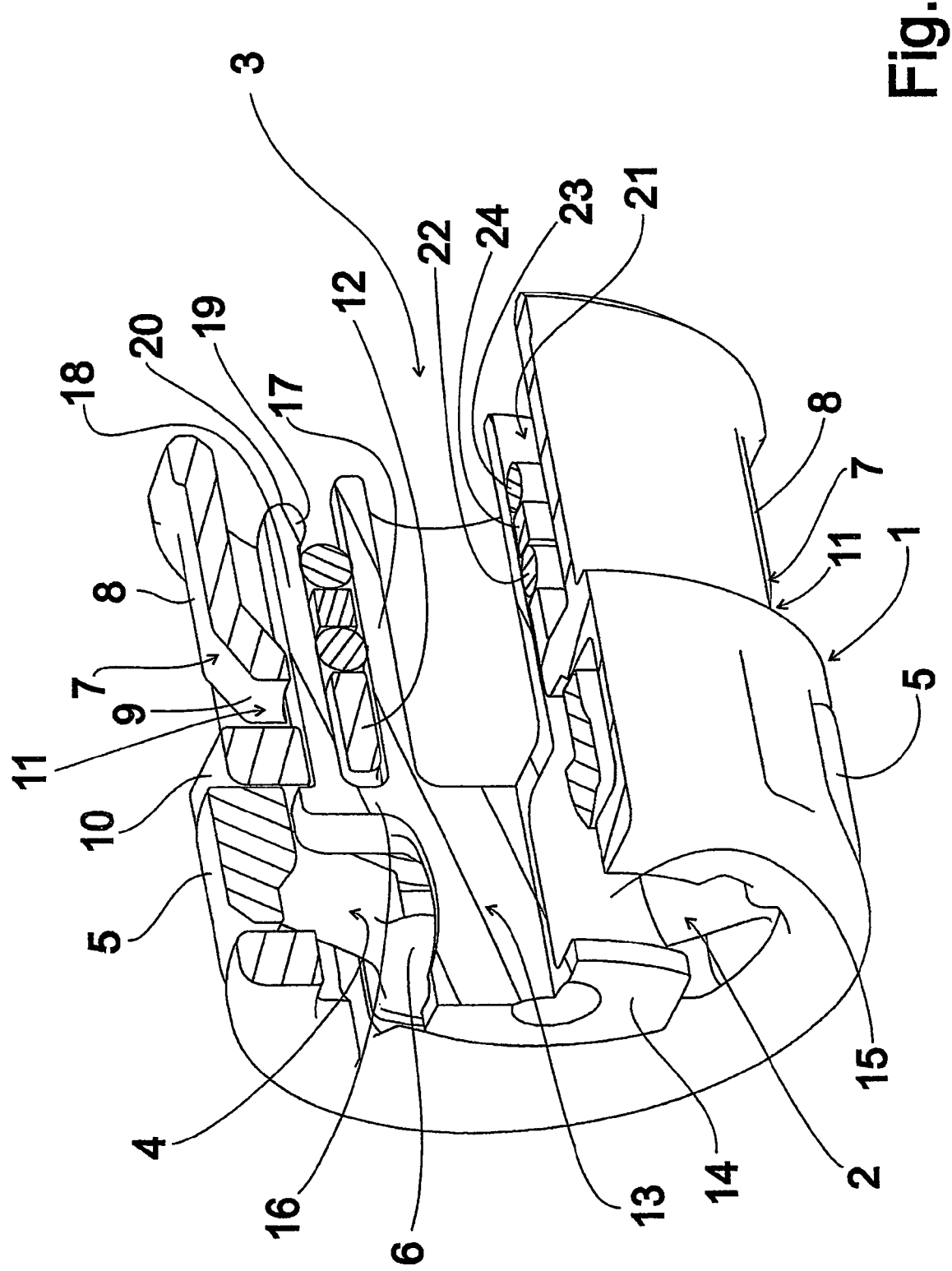

| | | | |
|---|---|---|---|
| 4,867,487 A * | 9/1989 | Phillis | 285/305 |
| 4,875,711 A * | 10/1989 | Watanabe | 285/45 |
| 4,887,666 A * | 12/1989 | Briet | 165/76 |
| 5,472,016 A | 12/1995 | Szabo | |
| 5,924,746 A | 7/1999 | Fixemer | |
| 6,349,978 B1 * | 2/2002 | McFarland et al. | 285/319 |
| 6,428,055 B1 | 8/2002 | Moretti et al. | |
| 6,517,115 B1 * | 2/2003 | Blivet | 285/23 |
| 6,837,525 B2 * | 1/2005 | Miyajima | 285/319 |
| 2003/0102667 A1 * | 6/2003 | Weller et al. | 285/319 |
| 2003/0160448 A1 | 8/2003 | Takayanagi | |
| 2006/0022461 A1 * | 2/2006 | Hull et al. | 285/319 |
| 2006/0022462 A1 * | 2/2006 | Hull et al. | 285/319 |
| 2006/0208485 A1 * | 9/2006 | Discher et al. | 285/319 |
| 2007/0007762 A1 * | 1/2007 | Hull et al. | 285/148.23 |

FOREIGN PATENT DOCUMENTS

| | | |
|---|---|---|
| WO | WO9945306 A | 9/1999 |
| WO | WO0079172 A | 12/2000 |

* cited by examiner

DEVICE FOR SEALINGLY LINKING TWO END PIECES

TECHNICAL FIELD

The invention relates to a device for sealingly linking two end pieces of a fluid line system, having a casing part into which the end pieces can be inserted, having an inner part that can be introduced into the casing part via a first introduction area, and having a sealing unit that is surrounded by the casing part and is set up for the mutual sealing of the end pieces.

BACKGROUND OF THE INVENTION

Such a device is known from EP 0 806 597 A1. The previously known device provided for linking two end pieces of a fluid line system has a casing part into which an inner part and a loose sealing ring that serves as a sealing unit can be introduced. When a first end piece that is configured with a sealing flange on the end is inserted via a first introduction area, longitudinal tongues of the casing part are pressed outward and the loose sealing ring comes to rest between the sealing flange and a face of the inner part, whereby the sealing flange is arranged between an inwardly pointing inner bead of the casing part and an outwardly pointing ring collar of the inner part. In this arrangement of the first end piece, the inner part is fixed, whereby a securing ring is slipped around the longitudinal tongues in the first introduction area in order to prevent the first end piece from slipping out unintentionally.

The inner part exhibits two springy arms which have lugs that project outward and which come into engagement with the ring bead when a second end piece configured with a ring bead is inserted into a second introduction area. Configured on the casing part are retaining fingers which, with proper arranging of the end piece configured with the ring bead, engage behind the ring bead and fix the second end piece. In this position, the lugs project beyond the outside of the casing part and by doing so, they indicate the proper arranging of the second end piece. With the previous device, although the provision of the lugs made it easy to see whether the second end piece is properly arranged, the linking of the end pieces is still relatively cumbersome.

The invention is based on the problem of suggesting a device of the type described above which is distinguished by a relatively simple and reliable linking of the end pieces, and with which the danger of the loss of the sealing unit is as good as impossible.

SUMMARY OF THE INVENTION

In a device of the type described above, according to the invention this problem is solved in that the inner part is supported inside the casing part in an axially displaceable manner and can be expelled via the first introduction area, that inside a second introduction area of the casing part, the sealing unit can be fixed, detachably from the inner part, with a retaining structure configured on the inner part, that configured inside the casing part between the first introduction area and the second introduction area is an abutment with which the sealing unit, starting from an arrangement fixed with the inner part, comes into engagement by means of an axial movement of the inner part from the second introduction area towards the first introduction area, and that the inner part exhibits a contact surface which, when an end piece is introduced into the second introduction area, comes into engagement with this end piece so that the inner part is displaced towards the first introduction area, thus releasing the sealing unit, and can be removed from the casing part.

Through the fact that with the inventive device, an inner part is present by means of which, first, the sealing unit is retained until an end piece is inserted, and second, which, after an end piece is inserted and after the sealing unit is released, serves, by means of the engagement with the abutment, as an indication for proper insertion of the end piece which comes into engagement with it, the end pieces can be reliably linked to each other with the inventive device with very few handling operations and, in particular, without the need for handling additional loose parts of the sealing unit, e.g., a sealing ring.

BRIEF DESCRIPTION OF THE INVENTION

Figure 2:
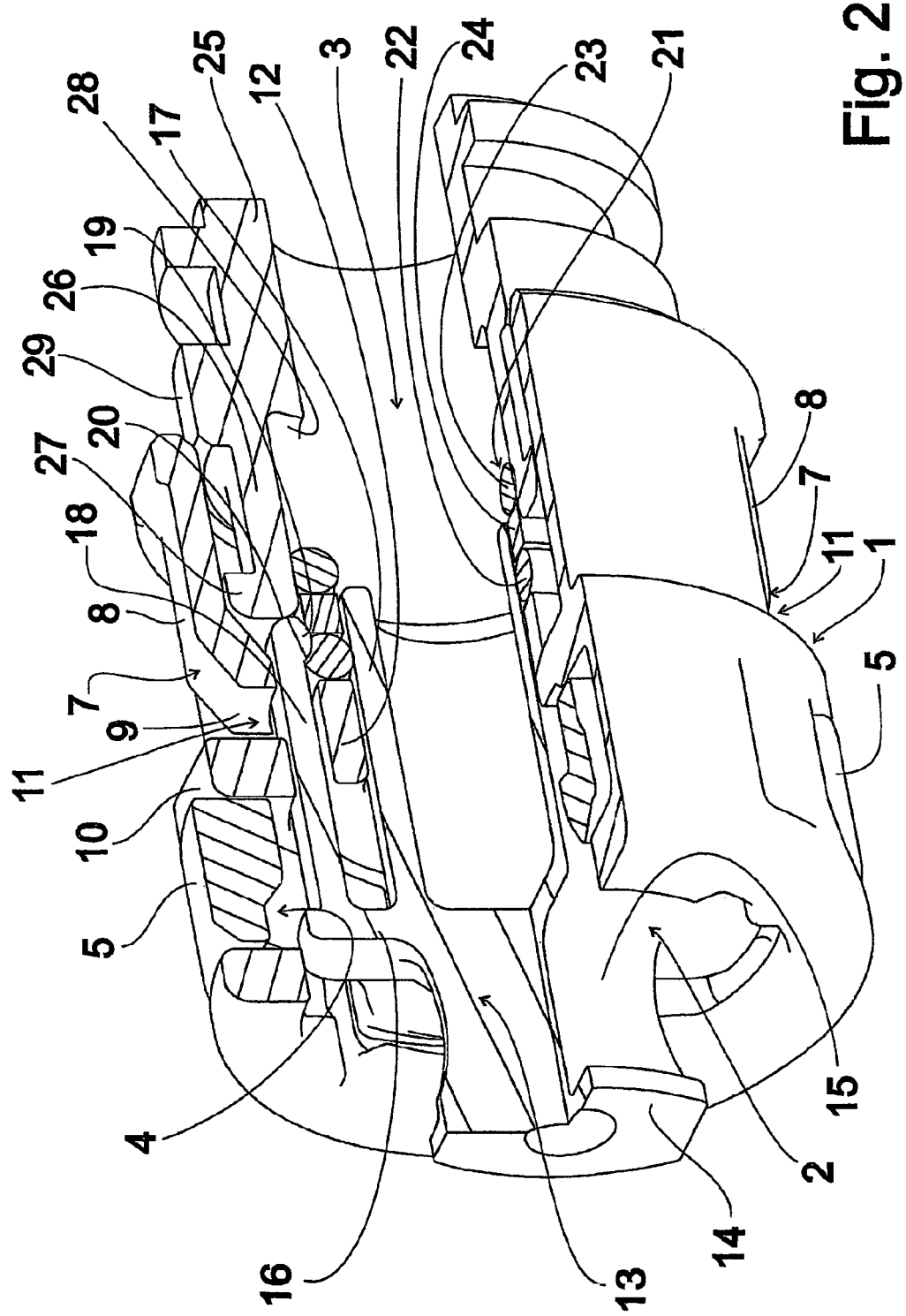
Figure 3:
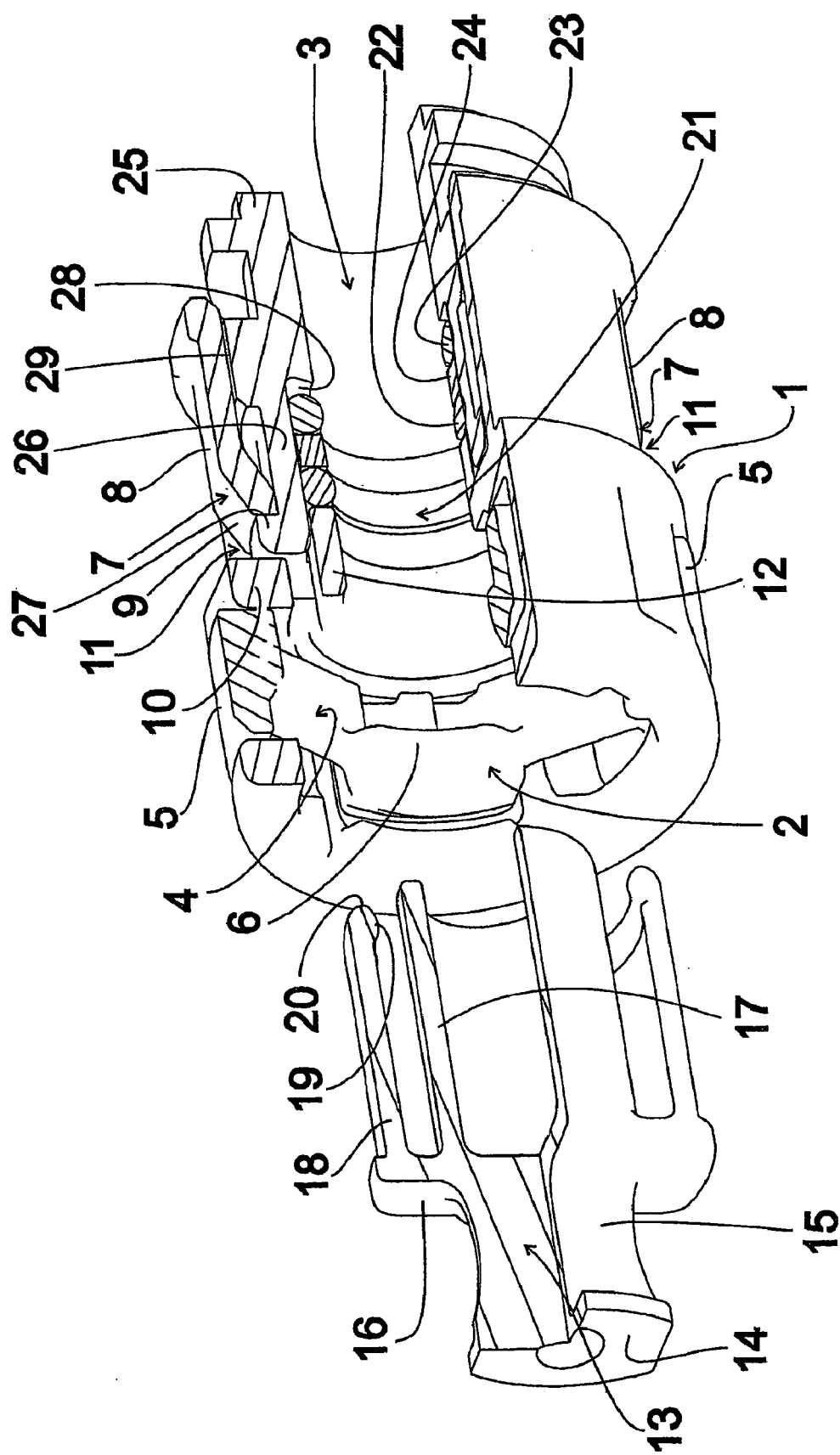

Additional useful further developments and advantages of the invention are the object of the subclaims and the following description of an embodiment of the invention including references to the figures in the drawing. The following are shown:

FIG. 1 A perspective, partially cut away view of an embodiment of the inventive device, with an inner part which is arranged inside a casing part and which fixes a sealing unit, FIG. 2 A perspective, partially cut away view of the embodiment according to FIG. 1, with an end piece of a fluid line system partially inserted into the casing part, and FIG. 3 A perspective, partially cut away view of the embodiment according to FIG. 1 and FIG. 2 with the end piece of a fluid line system completely inserted into the casing part.

DESCRIPTION DESCRIPTION

FIG. 1 shows a perspective, partially cut away view of an embodiment of the inventive device, with an essentially cylindrically configured casing part 1, which exhibits in the axial direction a first introduction area 2 and a second introduction area 3, which are arranged opposite each other.

In the first introduction area 2, the embodiment according to FIG. 1 has a ring-shaped securing spring 4 which is arranged in a suitable matched recess of the casing part 1. The securing spring 4 has free pressure areas 5, via which securing projections 6 inside the casing part 1 can be displaced into return recesses configured inside the casing part 1 when impinged upon by inwardly directed, manually applied pressing forces.

In a second introduction area 3 in this embodiment, formed on the casing part 1 are at least two elastic spring lugs 7, which exhibit a parallel section 8 that runs essentially axially and an inwardly angled locking section 9. A locking groove 11 is formed between the locking section 9 and an inner shoulder 10 that abuts the securing ring 4 on the inside. In the area of the inner shoulder 10 and the locking groove 11, the casing part 1 has a number of inner ring sections 12, which serve as abutments and lie on a circular peripheral line, and which are arranged at a radial distance inside the inner shoulder 10 and the locking groove 11. In a modification, not shown, that is provided especially for relatively small inside diameters, radially aligned locking sections are provided.

In addition, the embodiment according to FIG. 1 has an inner part 13, which, in the representation according to FIG. 1, is arranged inside the casing part 1. In the embodiment shown, the inner part 13 has a front plate 14, a neck piece 15 which adjoins the front plate 14 and which has a diameter that is smaller than the diameter of the front plate 14, and a distance plate 16 that is placed on the side of the neck piece 15 that is opposite the front plate 14. Formed as an inner section on the side of the distance plate 16 that is opposite the neck piece 15 is a cylindrical inner sleeve 17, the outside diameter of which is smaller than the inside diameter of the inner ring sections 12. In addition, the inner part 13 has at least two springy outer clamps 18, both of which are configured with end projections 19 having an inside end that is connected with the distance plate 16 and an outer end that points inward as a retaining structure, as well as a front contact surface 20. In the case of the embodiment shown in FIG. 1, the inner sleeve 17 project beyond the contact surfaces 20 in the axial direction.

Finally, the inventive device has a sealing unit 21, which in the embodiment according to FIG. 1, exhibits first sealing ring 22 that is circular on the inside and is adjacent to the distance plate 16, a second sealing ring 23 that is circular on the outside and faces the free end of the inner part 13, and a circular intermediate ring 24 that is arranged between the first sealing ring 22 and the second sealing ring 23. The sealing rings 22, 23 are made of an elastic material and exhibit a roundish cross section, while the intermediate ring 24 is made of a stiff material and exhibits a rectangular cross section. The dimension of the intermediate ring 24 in the radial direction is somewhat smaller than the diameter of the sealing rings 22, 23.

In the arrangement according to FIG. 1, the sealing rings 22, 23 and the intermediate ring 24 are arranged on the side of the inner ring sections 12 that face the second introduction area 3 and lie against the inner sleeve 17 on the inside, while on the outside they are surrounded by the outer clamps 18. It can be seen from FIG. 1 that the end projections 19 narrow the free space between the inner sleeve 17 and the outer clamps 19 somewhat, so that the sealing rings 22, 23 and the intermediate ring 24 are detachably fixed by the inner part 13 when arranged between the inner sleeve 17 and the outer clamps 18.

The arrangement according to FIG. 1 shows the application-ready configuration of the embodiment. This configuration is usually prepared by the manufacturer, in that the inner part 13 is introduced into the first introduction area 2 until, by guiding the inner sleeve 17 through the inside of the inner ring sections 12 and the outer clamps 18 through the recesses formed between the inner ring sections 12, the distance plate 16 lies against inner ring sections 12 of the casing part 1. In addition, in this position the front plate 14 advantageously terminates with the face of the casing part 1 in the first introduction area 2, or even falls behind it.

Furthermore, in this position the first sealing ring 22, the intermediate ring 24 and the second sealing ring 23 are now introduced via the second introduction area 3 of the casing part 1 between the inner sleeve 17 and the outer clamps 18 through the narrow place between the inner sleeve 17 and the end projections 19, whereby here again the inner ring sections 12 now form a limit stop for the sealing unit 21. The inventive device has now been prefabricated ready for use, whereby all of the individual parts, namely, the casing part 1, the inner part 13 and the sealing unit 21, are detachably linked with each other, and in particular, the sealing unit 21 is safeguarded against loss.

FIG. 2 shows a perspective, partially cut away view of the embodiment according to FIG. 1, with an end piece 25 of a fluid line system introduced and partially inserted into the second introduction area 3 of the casing part 1. For example, the end piece 25 is part of a fixed fitting of a tank to which a pipeline is to be connected. The end piece 25 has at its free end a cylindrical section 26, on the front end of which a circumferential ring flange 27 that projects radially outwardly is configured. At a distance from the ring flange 27, the end piece 25 exhibits radially on the inside an approximately radially aligned ring-shaped receiving surface 28, the surface contour of which approximately corresponds to the outer surface of the second sealing ring 23. Also at a distance from the ring flange 27, the end piece 25 is configured with a cylindrical guide surface 29, the outside diameter of which essentially corresponds to the inside diameter of the casing part 1 in the area of the parallel sections 8.

In the arrangement according to FIG. 2, which forms an intermediate position during the locking of the end piece 25 with the casing part 1, the end piece 25 has already been inserted to the extent that the face of the end piece 25, lying against the contact surfaces 20 of the outer clamps 18, has displaced the inner part 13 in the direction of the first introduction area 2 to the extent that, after lying against the first sealing ring 22 at the inner ring sections 12 that form an abutment in this embodiment, the second sealing ring 23 has completely released from the inner part 13 and the intermediate ring 24 has already passed the narrow place at the end projections 19, but is still arranged around the inner sleeve 17. The projection of the front plate 14 beyond the face of the casing part 1 situated in the first introduction area 2 shows the relative position of the end piece 25 versus the casing part 1 during the insertion procedure with this embodiment.

FIG. 3 shows a perspective, partially cut away view of the embodiment according to FIG. 1 and FIG. 2 with the end piece 25 completely inserted into the casing part 1 and located in its end position. It can be seen from FIG. 3 that in this arrangement of the end piece 25, the ring flange 27 is arranged inside the locking groove 11, the locking sections 9 engage behind the ring flange 27, and the guide surface 29 lies in the area of the parallel sections 8 so that the end piece 25 is now locked in an essentially play free manner with the casing part 1. The sealing rings 22, 23 and the intermediate ring 24 of the sealing unit 21 are arranged, with a small amount of axial play, between the inner ring sections 12 of the casing part 1 and the receiving surface 28 of the end piece 25. The inner part 13 has already been expelled from the casing part 1 via the first introduction area 2, e.g., by catching on the neck piece 15, whereby after the end piece 25 has locked with the casing part 1, the distance plate 16 was aligned approximately flush with the face of the casing part 1 lying in the first introduction area 2, in order to indicate the proper assumption of the end position of the end piece 25 with the casing part 1.

Now, after the inner part 13 has been removed from the casing part 1, an additional further end piece that is not shown in the Figures, e.g., a flexible fluid line, can be inserted in a way known in the art into the first introduction area 2 of the casing part 1, all the way through the inner ring sections 12, and into the sealing unit 21 until the securing projections 6 of the securing spring 4 engage behind a circumferential securing projection formed on the end of the additional end piece, so that the additional end piece is detachably locked with the casing part 1. In this arrangement, a cylindrical sealing section of the additional end piece lies on the inside against the sealing rings 22, 23 so that the end piece 25 and the additional end piece are sealingly linked to each other.

In an additional embodiment, not shown, that is modified with respect to the embodiment of an inventive device according to FIG. 1, the inner part 13 exhibits a front plate 14 against which the inner sleeve 17 and the outer clamps 18 are directly placed. In this modified embodiment, the axial dimensions of the casing part 1 and the inner part 13 are set in such a way that the front plate 14 does not project beyond the face of the casing part 1 in the area of the first introduction area 2 until the end piece 25 has locked with the casing part 1. This way, the inner part 13 cannot be grasped for complete removal until the insertion procedure has been completely finished.

In an another additional embodiment, not shown, that is modified with respect to the embodiment according to FIG. 1, the length of the neck piece 15 is set in such a way that the front plate 14 does not project beyond the face of the casing part 1 in the area of the first introduction area 2 until the end piece 25 locks with the casing part 1. This way, once again the inner part 13 cannot be grasped for complete removal until the insertion procedure has been completely finished.

In the embodiments mentioned above, it is advantageous for the front plate 14 to completely fill the cross section of the casing part 1 in the first introduction area 2.

In another modification of the embodiment according to FIG. 1, the length of the neck piece 15 and the diameter of the front plate 14 are set in such a way that the front plate 14 lies against the face of the casing part 1 in the first introduction area 2.

The invention claimed is:

1. Device for sealingly linking two end pieces of a fluid line system, the device having a casing part into which the end pieces can be inserted, an inner part that can be introduced into the casing part via a first introduction area, and a sealing unit that is surrounded by the casing part and is set up for the mutual sealing of the end pieces, characterized in that
   the inner part (13) is supported inside the casing part (1) in an axially displaceable manner and can be expelled via the first introduction area (2),
   inside a second introduction area (3) of the casing part (1), the sealing unit (21) can be fixed, detachably from the inner part (13), with a retaining structure (19) configured on the inner part (13),
   configured inside the casing part (1) between the first introduction area (2) and the second introduction area (3) is an abutment (12) with which the sealing unit (21), starting from an arrangement fixed with the inner part (13), comes into engagement by means of an axial movement of the inner part (13) from the second introduction area (3) towards the first introduction area (2), and
   the inner part (13) exhibits a contact surface (20) which, when an end piece (25) is introduced into the second introduction area (3), comes into engagement with this end piece (25) so that the inner part (13) is displaced towards the first introduction area (2), thus releasing the sealing unit (21), and can be removed from the casing part (1).

2. Device according to claim 1, characterized in that the sealing unit (21) exhibits at least one circular sealing ring (22, 23).

3. Device according to claim 2, characterized in that the inner part (13) in the area of the retaining structure (19) exhibits a cylindrical inner section (17), which can be directed through the or each sealing ring (22, 23) of the sealing unit (21) in order to support the sealing unit (21), and which lies loosely against the or each sealing ring (22, 23).

4. Device according to claim 2, characterized in that the inner part (13) exhibits at least two outer clamps (18) that surround the or each sealing ring (22, 23) of the sealing unit (21) in order to fix the sealing unit (21).

5. Device according to claim 4, characterized in that the retaining structure exhibits projections (19) that are formed on the inner section (17) and/or the outer clamps (18) of the inner part (13).

6. Device according to claim 4 characterized in that the inner section (17) projects beyond the outer clamps (18).

7. Device according to claim 1 characterized in that the abutment exhibits ring sections (12) that lie on a circular periphery with a diameter that corresponds to the diameter of the sealing ring (22) that is adjacent to the ring sections (12).

8. Device according to claim 7, characterized in that when the inner part (13) is arranged inside the casing part (1), outer clamps (18) engage between recesses configured between the ring sections (12).

9. Device according to claim 1 characterized in that the inner part (13) exhibits a front plate (14) that is arranged inside the casing part (1) with the inner part (13) arrangement that fixes the sealing unit (21).

10. Device according to claim 9, characterized in that when the end piece (25) is pushed into the second introduction area (3), the front plate (14) projects beyond a face of the casing part (1) lying inside the first introduction area (2).

11. Device according to claim 9, until the end piece (25) reaches its end position to link with the other end piece, the front plate (14) is arranged behind a face of the casing part (1) lying inside the first introduction area (2), and projects beyond the face when the end position is reached.

* * * * *